(12) United States Patent
Sugimura (10) Patent No.: US 12,151,732 B2
(45) Date of Patent: Nov. 26, 2024

(54) WORK VEHICLE (71) Applicant: HONDA MOTOR CO., LTD., Tokyo (JP)

(72) Inventor: Kentaro Sugimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/250,627

(22) PCT Filed: Oct. 30, 2020

(86) PCT No.: PCT/JP2020/040853
§ 371 (c)(1),
(2) Date: Apr. 26, 2023

(87) PCT Pub. No.: WO2022/091353
PCT Pub. Date: May 5, 2022

(65) Prior Publication Data
US 2023/0399041 A1   Dec. 14, 2023

(51) Int. Cl.
*B62B 5/00* (2006.01)
*B62B 3/08* (2006.01)
*B62B 5/06* (2006.01)

(52) U.S. Cl.
CPC .............. *B62B 5/0053* (2013.01); *B62B 3/08* (2013.01); *B62B 5/06* (2013.01)

(58) Field of Classification Search
CPC ............ B62B 5/0053; B62B 3/08; B62B 3/06
(Continued)

(56) References Cited

U.S. PATENT DOCUMENTS 2,704,227 A * 3/1955 Sidler, Jr. .................. B62B 3/08
298/17.5
4,666,170 A * 5/1987 Vasa ........................ A61G 5/06
280/291
(Continued)

FOREIGN PATENT DOCUMENTS

CN         105438237 A  *  3/2016
CN         106741076 A  *  5/2017   ............... B62B 3/08
(Continued)

OTHER PUBLICATIONS

Japanese Office Action dated Sep. 5, 2023 issued in corresponding Japanese application No. 2022-558760; English translation included (6 pages).
(Continued)

*Primary Examiner* — Hilary L Gutman
(74) *Attorney, Agent, or Firm* — Rankin, Hill & Clark LLP (57) ABSTRACT

This work vehicle includes: an electric driving source which is driven by electrical power; and a travel part which is operated by the electric driving source. At least a portion of a loading part for loading an object to be loaded is provided above a first direction-side portion of the travel part. In addition, at least a portion of a detachable batch storage part, which has an accommodation part capable of accommodating a detachable battery, is provided above a portion of the travel part on a side in a second direction reverse to the first direction. An opening is formed in an upper portion of the accommodation part. The opening is directed upward and the axial line of the accommodation part in the battery attachment/detachment direction inclines to be directed in the first direction or the second direction.

10 Claims, 5 Drawing Sheets

(58) Field of Classification Search
USPC .......................................................... 298/17 R
See application file for complete search history.

(56) References Cited

U.S. PATENT DOCUMENTS

| | | | | |
|---|---|---|---|---|
| 4,811,988 | A | * | 3/1989 | Immel ....................... B62B 3/08 |
| | | | | D34/16 |
| 6,056,077 | A | | 5/2000 | Kobayashi |
| 6,470,981 | B1 | * | 10/2002 | Sueshige .............. B60K 7/0007 |
| | | | | 180/65.6 |
| 2012/0146386 | A1 | | 6/2012 | Rowlands |
| 2016/0207554 | A1 | | 7/2016 | Johnson et al. |
| 2019/0023265 | A1 | | 1/2019 | Takeda et al. |
| 2020/0274119 | A1 | | 8/2020 | Okubo et al. |
| 2021/0039697 | A1 | * | 2/2021 | Shibata ................... F16H 48/20 |
| 2021/0039698 | A1 | * | 2/2021 | Kato ........................ B62B 5/06 |
| 2021/0039701 | A1 | * | 2/2021 | Ifuku ....................... B62B 5/06 |
| 2021/0039702 | A1 | * | 2/2021 | Kutsuna ................... B62B 3/08 |
| 2021/0039703 | A1 | * | 2/2021 | Kato ..................... B62B 5/0414 |
| 2021/0237310 | A1 | * | 8/2021 | Scott ....................... B28C 7/067 |
| 2022/0410956 | A1 | * | 12/2022 | Nashimoto ........... B62B 5/0053 |
| 2023/0399041 | A1 | * | 12/2023 | Sugimura ................. B62B 3/02 |
| 2023/0399814 | A1 | * | 12/2023 | Sugimura ............. E02F 9/0858 |
| 2023/0406386 | A1 | * | 12/2023 | Li ............................. B62B 3/08 |
| 2024/0032760 | A1 | * | 2/2024 | Sugimura ............... A47L 11/18 |

FOREIGN PATENT DOCUMENTS

| | | | | | |
|---|---|---|---|---|---|
| DE | 4113254 | A1 | * | 2/1992 | ........... B62B 3/0618 |
| FR | 2695699 | A1 | * | 3/1994 | ........... B62B 5/0026 |
| GB | 2402378 | A | * | 12/2004 | ................ B60P 1/06 |
| JP | H10-129491 | A | | 5/1998 | |
| JP | 10-203459 | A | | 8/1998 | |
| JP | 2001-239938 | A | | 9/2001 | |
| JP | 2019-022338 | A | | 2/2019 | |
| JP | 2019-068720 | A | | 4/2019 | |
| WO | 2019/064593 | A1 | | 4/2019 | |

OTHER PUBLICATIONS

International Search Report, International Application No. PCT/JP2020/040853, Date of mailing: Dec. 28, 2020, 2 pages.

* cited by examiner

WORK VEHICLE

TECHNICAL FIELD

The present invention relates to a work vehicle including a loading unit on which a loaded object is loaded.

BACKGROUND ART

A transport carriage, which is one type of work vehicle, includes: a traveling unit including traveling wheels formed of wheels, rollers, and the like; and a loading unit provided above the traveling unit. The loading unit is formed of, for example, a bucket (hopper), and a loaded object such as earth and sand or cargo is loaded on the loading unit. In U.S. Pat. No. 2012/0146386 A1, it is proposed to employ a motor as a traveling drive source for such a transport carriage. The motor is supplied with electric power from a battery.

Further, JP 2001-239938 A discloses an electric carriage in which traveling wheels are provided below a frame-shaped load carrying platform, and a battery is disposed rearward of the load carrying platform in the traveling direction. In this electric carriage, the operator operates a switch to turn on/off the electric assist function, and when the electric assist function is turned on, the electric assist force is added to the force with which the operator moves the electric carriage.

SUMMARY OF THE INVENTION

When a loaded object of considerable weight is loaded on the front side of the load carrying platform (loading unit), a considerable load acts on the front portion of the work vehicle. That is, the weight is unbalanced between the front portion and the rear portion of the work vehicle. When such a situation occurs, the posture of the work vehicle may become unstable.

A main object of the present invention is to provide a work vehicle capable of maintaining a stable posture even when a loaded object is loaded on a loading unit.

According to an embodiment of the present invention, there is provided a work vehicle comprising: an electric drive source driven by electric power; a traveling unit driven by the electric drive source; a loading unit at least a part of which is provided above a portion of the traveling unit on a side of a first direction, and on which a loaded object is loaded; and a detachable battery storage unit at least a part of which is provided above a portion of the traveling unit on a side of a second direction that is opposite to the first direction, wherein the detachable battery storage unit includes a housing portion that is configured to house a detachable battery configured to supply electric power to the electric drive source, and an opening that is formed in an upper portion of the housing portion, the detachable battery being inserted or removed through the opening, and the opening is oriented upward, and an axis line of the housing portion that extends in a battery attachment/detachment direction is inclined so as to be oriented in the first direction or the second direction.

It should be noted that the "opposite direction" means the other direction side with respect to one direction side, more specifically, a "reverse direction". For example, when the direction in which the operator faces is the first direction, the direction toward the back side of the operator is the second direction. In a case of the work vehicle in which the traveling unit includes a crawler, it is generally recognized that "the side on which the drive sprocket is disposed is the rear side".

Therefore, when the side on which the drive sprocket is not disposed is defined as the first direction, the direction toward the front side of the work vehicle is the first direction, and the direction toward the rear side thereof is the second direction.

According to the present invention, since the loading unit and the detachable battery storage unit are disposed on opposite sides, even when a loaded object is loaded on the loading unit and a load acts on the first direction side of the work vehicle, the load (or weight) can be substantially balanced between the first direction side and the second direction side. As a result, the posture of the work vehicle is prevented from becoming unstable, and various types of work such as transportation work, for example, can be smoothly performed by the work vehicle.

In addition, the opening of the detachable battery storage unit is oriented upward, and the axis line, of the housing portion that houses the detachable battery, along the battery attachment/detachment direction is inclined so as to be oriented in the first direction or the second direction. Therefore, for example, the inner wall of the housing portion that faces downward receives a part of the weight of the detachable battery. That is, the housing portion bears the load of the detachable battery. Therefore, it is possible to reduce the force required when the operator pushes the detachable battery into the housing portion or pulls the detachable battery out of the housing portion, compared to a case where the axis line of the detachable battery storage unit extends in the vertical direction. In other words, the detachable battery can be easily attached to and detached from the housing portion.

In addition, since the detachable battery storage unit is inclined as described above, the center of gravity of the detachable battery storage unit can be easily separated from the loading unit toward the second direction side, compared to a state where the detachable battery storage unit is not inclined.

As a result, it becomes easier to balance the weight of the loading unit (on the first direction side) on which the loaded object is loaded and the weight of the detachable battery storage unit (on the second direction side). Therefore, the posture of the work vehicle is further prevented from becoming unstable, so that the above-described work can be more smoothly performed.

DETAILED DESCRIPTION OF THE INVENTION

Hereinafter, a preferred embodiment of a work vehicle according to the present invention will be described in detail with reference to the accompanying drawings. In the present embodiment, a transport carriage also referred to as a dump cart is exemplified as the work vehicle. In the following description, "front (forward)" refers to the front side of an operator gripping an operation handle in FIG. 1, and "rear (rearward)" refers to the opposite side thereto, that is, the back side of the operator.

Figure 1:
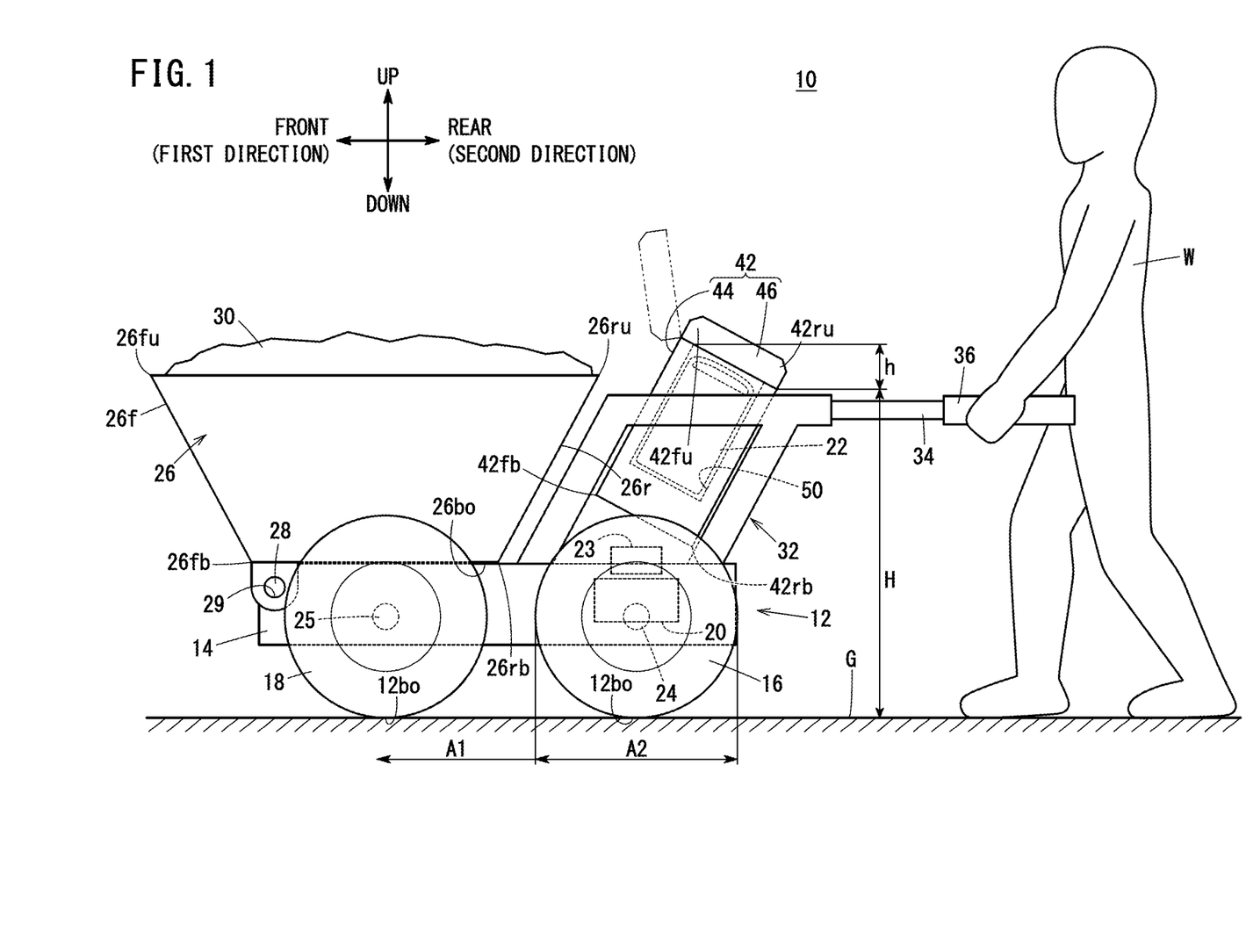
FIG. 1 is a schematic overall side view of a transport carriage which is a work vehicle according to an embodiment of the present invention.

FIG. 1 is a schematic overall side view of a transport carriage 10. The transport carriage 10 includes a traveling unit 12. In this case, the traveling unit 12 includes two driving wheels 16 supported by a main frame 14 and positioned on the rear side (retreating side) in the traveling direction, and two driven wheels 18 supported by the main frame 14 and positioned on the front side (advancing side) in the traveling direction.

As the driving wheels 16 rotate in the counterclockwise direction in FIG. 1, the transport carriage 10 moves forward. On the other hand, when the driving wheels 16 rotate in the clockwise direction in FIG. 1, the transport carriage 10 moves backward.

Note that the driven wheel 18 is a first wheel, and the driving wheel 16 is a second wheel. The lowest position of each of the driving wheels 16 and the driven wheels 18 is a ground contact portion 12bo that contacts the ground G, and is the lowest position of the traveling unit 12.

Hereinafter, for convenience of description, a front (forward) direction is defined as a "first direction", and a rear (rearward) direction opposite thereto is defined as a "second direction". According to this definition, the driven wheels 18 are disposed on the first direction side of the transport carriage 10, and the driving wheels 16 are disposed on the second direction side of the transport carriage 10.

A motor 20 is supported in the vicinity of a rear end (an end portion on the second direction side) of the main frame 14. The motor 20 is an electric drive source that is driven by receiving power supply from a detachable battery (hereinafter, also simply referred to as a "battery") 22, which will be described later. Further, a power drive unit (PDU) 23 for converting DC power of the battery 22 into AC power is provided above and adjacent to the motor 20. It goes without saying that the PDU 23 is one of electrical components that receive power supply from the battery 22.

A drive shaft 24 is coupled to a rotation shaft of the motor 20 via a worm gear and a spur gear (not shown). As the rotation shaft rotates under the action of the motor 20, the drive shaft 24 rotates, and as a result, the driving wheels 16 rotate. On the other hand, a driven shaft 25 is rotatably supported by the main frame 14, and the driven wheels 18 are each provided at a distal end of the driven shaft 25. As the driving wheels 16 rotate, the driven wheels 18 and the driven shaft 25 integrally rotate.

A bucket 26 (loading unit) is disposed on a front upper portion of the main frame 14. A front lower end 26fb, which is a front end of a lower surface 26bo of the bucket 26, is connected to a front end of the main frame 14 via a connecting pin 28. To be specific, a first insertion hole 29 is formed in the front end of the main frame 14, and a second insertion hole (not shown) is formed in the front lower end 26fb of the bucket 26.

Then, the connecting pin 28 is inserted through the first insertion hole 29 and the second insertion hole which are overlapped with each other.

The bucket 26 is located above the driven wheels 18. To be more specific, a rear lower end 26rb, which is a rear end of the lower surface 26bo of the bucket 26, is located between the driven wheel 18 and the driving wheel 16 in side view. In other words, the rear lower end 26rb is located in a range A1 (on the first direction side) in front of a front end of the driving wheel 16. That is, the lower surface 26bo of the bucket 26 acts on the first direction side (front portion side) of the transport carriage 10. Note that a front end 26f of the bucket 26 is inclined from the second direction side toward the first direction side as it goes from the front lower end 26fb to a front upper end 26fu. On the other hand, a rear end 26r of the bucket 26 is inclined from the first direction side toward the second direction side as it goes from the rear lower end 26rb to a rear upper end 26ru.

The bucket 26 may be located at any position as long as the load of the bucket 26 practically acts on a portion of the transport carriage 10 on the first direction side (the driven wheels 18). For this purpose, it is sufficient to arrange the lower surface 26bo of the bucket 26 in the range A1. A part of the rear end 26r of the bucket 26 (for example, a rear upper portion including the rear upper end 26ru) may be located rearward of the front end of the driving wheel 16 in side view as shown in FIG. 1, that is, in a range A2 described later.

A substantially intermediate portion of the bucket 26 in the front-rear direction is held by the main frame 14 via a first lock mechanism (not shown). On the other hand, when the bucket 26 is released from the restraint by the first lock mechanism, the bucket 26 can pivot about the connecting pin 28 such that the rear end 26r rises in the counterclockwise direction in FIG. 1.

For example, earth and sand, rocks, or the like are loaded on the bucket 26 as a loaded object 30. As the driving wheels 16 and the driven wheels 18 rotate, the transport carriage 10 can move forward or backward in a state where the loaded object 30 is held on the bucket 26.

Figure 2:
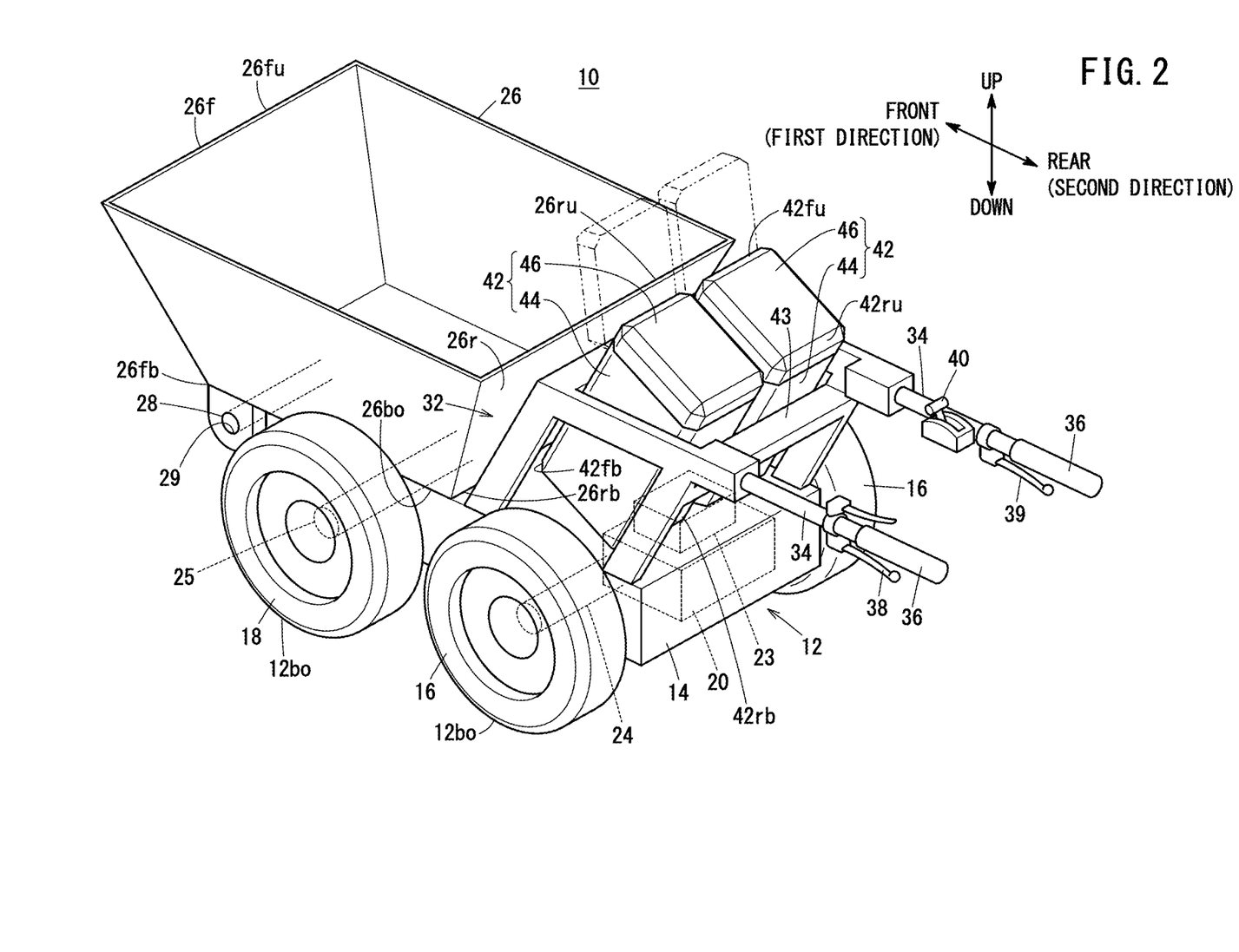
FIG. 2 is a schematic rear perspective view showing a first direction side seen from a rear side of the transport carriage.

A sub frame 32 rises from a rear portion (the second direction side) of the main frame 14. As shown in FIG. 2, the sub frame 32 includes two front-rear direction bars 34 extending in the second direction (rearward) from the vicinity of the rear end 26r of the bucket 26. Rear ends of the two front-rear direction bars 34 form a pair of grip portions 36 to be gripped by an operator W. In the vicinity of the grip portions 36, for example, a clutch lever 38, a release lever 39 for releasing locking of the bucket 26 by the first lock mechanism, a throttle lever 40 for setting the traveling speed of the transport carriage 10, and the like are provided. As can be understood from this, the front-rear direction bars 34 extending in the second direction form an operation unit provided with the grip portions 36.

In the illustration of FIG. 1, the rear ends of the two front-rear direction bars 34 are open, but a bridge bar extending in a direction substantially orthogonal to the front-rear direction may be bridged between the rear ends. In this configuration, the grip portions 36, the three levers 38, 39, and 40, and the like can be provided on the bridge bar.

In a space formed by the rear end 26r (the rear surface) of the bucket 26 and the sub frame 32 (between the two front-rear direction bars 34), two battery cases 42 serving as detachable battery storage units are supported so as to be arranged in parallel in a direction orthogonal to the front-rear direction.

That is, the battery cases 42 are arranged in parallel on the front side and the back side in a direction orthogonal to the plane of FIG. 1. A support bar 43 (see FIG. 2) is bridged between the two front-rear direction bars 34, and rear upper portions (upper end portions on the second direction side) of the battery cases 42 are supported by the support bar 43.

As can be seen from FIG. 1, each of the battery cases 42 is inclined such that a front lower end 42fb and a front upper end 42fu, which are respectively a lower end and an upper end on the first direction side, are located above (higher than) a rear lower end 42*rb* and a rear upper end 42*ru*, which are respectively a lower end and an upper end on the second direction side. That is, the battery case 42 is inclined downward (to be lower) from the front end (the end portion in the first direction) toward the rear end (the end portion in the second direction), in other words, is inclined so as to approach the ground G. Therefore, the front lower end 42*fb* is located on the first direction side, and the rear upper end 42*ru* is located on the second direction side.

The battery cases 42 are each located above the traveling unit 12. To be more specific, a lower surface 42*bo* of the battery case 42 (a range from the front lower end 42*fb* to the rear lower end 42*rb*) is disposed so as to be located within and above the range A2 of the front-rear direction width of the driving wheel 16 in side view. Therefore, the load of the battery cases 42 and the batteries 22 acts on a portion of the transport carriage 10 on the second direction side (the rear portion side, the driving wheels 16). Note that the battery cases 42 may each be located at any position as long as the load of the battery case 42 practically acts on the portion of the transport carriage 10 on the second direction side (the rear portion side, the driving wheels 16). For this purpose, the battery cases 42 may each be disposed such that the lower surface 42*bo* is located within the range A2. In this arrangement, as illustrated in FIG. 1, the rear upper end 42*ru* of the battery case 42 may extend slightly further in the second direction (rearward) than the driving wheel 16 (the range A2). In addition, a part of the lower surface 42*bo* may overlap the driving wheel 16 in side view.

As the battery case 42, for example, a battery case may be adopted which is configured according to the battery case included in the battery storage device described in WO 2019/064593 A1 and is set so as to be able to house only one battery 22. That is, the main configuration of the battery case 42 is known, and therefore, detailed description and illustration thereof will be omitted.

Figure 3:
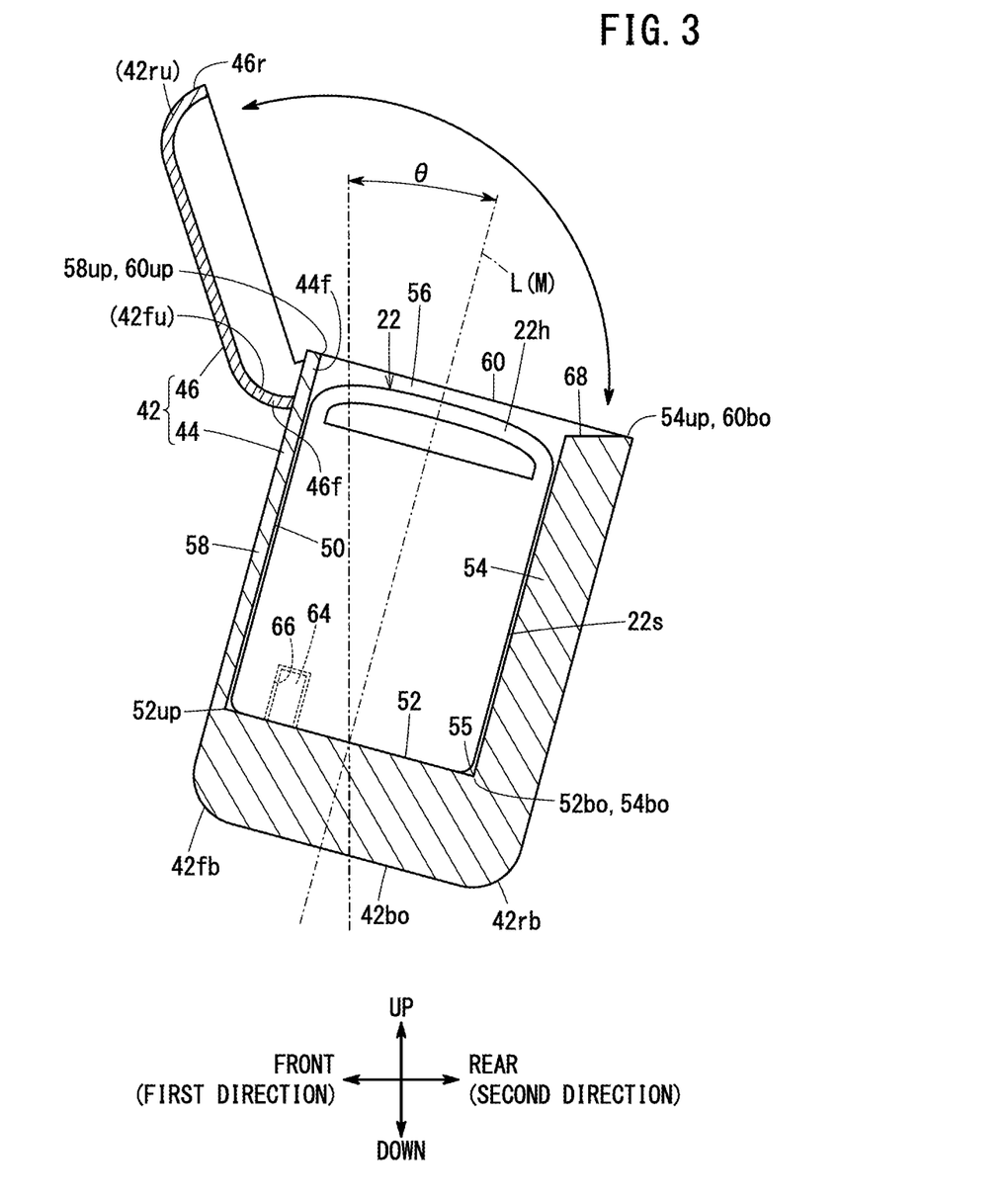
FIG. 3 is a schematic longitudinal cross-sectional view of a main portion of a battery case that is a detachable battery storage unit.

As shown in FIG. 3, the battery case 42 includes a case body 44, and a lid member 46 connected to the case body 44 via a hinge (not shown). The case body 44 has a substantially rectangular parallelepiped shape, and a housing portion 50 capable of housing the battery 22 is formed inside the case body 44. When the lid member 46 pivots so as to rise forward and upward, the battery case 42 is brought into an open state in which the housing portion 50 is visually recognized. On the other hand, when the lid member 46 pivots rearward and downward and covers the case body 44, the battery case 42 is brought into a closed state in which the housing portion 50 is hidden. The lid member 46 is locked to the case body 44 by a second lock mechanism (not shown). In this case, the lid member 46 is maintained in the closed state unless the second lock mechanism is released.

In the present embodiment, the battery 22 has a substantially rectangular parallelepiped shape such as shown in FIG. 1 of JP 2019-068720 A. Therefore, the housing portion 50 has a shape obtained by hollowing out a quadrangular prism.

Specifically, the housing portion 50 is a space defined by one bottom wall 52 and four side walls.

One of the side walls is a lower side wall 54 facing downward, and a corner portion 55 is formed at the intersection of the lower side wall 54 and the bottom wall 52. Further, two of the side walls are lateral side walls 56 rising from the lower side wall 54, and the remaining one of the side walls is an upper side wall 58 connected to the two lateral side walls 56 and opposing the lower side wall 54. An opening 60 for inserting or removing the battery 22 is formed in an upper portion of the housing portion 50. That is, the battery case 42 includes the opening 60 oriented upward.

In the present embodiment, the battery 22 is attachable to and detachable from the battery case 42 (insertable into and removable from the housing portion 50). It goes without saying that the battery 22 passes through the opening 60 at the time of attachment and detachment. An axis line L of the housing portion 50 extends in a movement direction of the battery 22 when the battery 22 is inserted into or removed from the housing portion 50, that is, an attachment/detachment direction.

Since the battery cases 42 are each inclined in a state of being supported by the support bar 43 or the like as described above, the axis line L of the housing portion 50 is also inclined. In this case, the axis line L of the housing portion 50 is inclined upward (so as to be higher) from the first direction side toward the second direction side. An inclination angle θ of the axis line L of the housing portion 50 with respect to the vertical direction is preferably 10° to 45°. This is because, by setting in this manner, the battery 22 can be easily pushed into or pulled out from the housing portion 50.

The opening 60 is inclined so as to be substantially orthogonal to the axis line L of the housing portion 50.

Specifically, the opening 60 includes an opening upper end 60*up* (highest portion) which is at the highest position, and an opening lower end 60*bo* (lowest portion) which is at the lowest position, the opening upper end 60*up* being located on the first direction side, and the opening lower end 60*bo* being located on the second direction side. Therefore, the opening 60 is oriented in the second direction. Note that the opening upper end 60*up* is substantially at the same position as an upper end 58*up* which is an end of the upper side wall 58 on the opening 60 side, and the opening lower end 60*bo* is substantially at the same position as an upper end 54*up* which is an end of the lower side wall 54 on the opening 60 side.

It is preferable that a height H of the opening lower end 60*bo* of the opening 60 from the ground contact portion 12*bo* is set at a position where it is not necessary to largely bend down when inserting or removing the battery 22, for example, based on the average height of an adult male living in a country or an area where the transport carriage 10 is used. For example, the height H is preferably in a range of 80 cm to 120 cm, and more preferably in a range of 80 cm to 100 cm. In addition, the opening 60 may be disposed above the grip portion 36 (the front-rear direction bar 34).

The sub frame 32 may be provided in a tilting unit so that the inclination angle of the battery case 42 with respect to the ground G can be changed. In this case, by tilting the sub frame 32 with the tilting unit, the height position H and the inclination angle θ can be appropriately changed according to the physique of the operator W. Therefore, the versatility of the transport carriage 10 is enhanced. Note that, even when the tilt angle of the sub frame 32 is changed, the entire battery case 42 is located above the traveling unit 12.

The bottom wall 52 serves to stop the battery 22 inserted into the housing portion 50 and to prevent the battery 22 from further entering. That is, the bottom wall 52 is a battery positioning portion. The bottom wall 52 is inclined so as to be substantially orthogonal to each of the side walls (the lower side wall 54, the two lateral side walls 56, and the upper side wall 58) and substantially parallel to the opening 60.

Therefore, the bottom wall 52 includes a bottom upper end 52*up* which is at the highest position and a bottom lower end 52*bo* which is at the lowest position, the bottom upper end 52*up* being located on the first direction side, and the bottom lower end 52*bo* being located on the second direction side.

On the bottom wall 52, for example, a device-side connector 64 is provided at a position close to the upper sidewall 58, more specifically, at a position closer to the bottom upper end 52*up* than a perpendicular line that is orthogonal to a line connecting the bottom upper end 52*up* and the bottom lower end 52*bo* and that passes through a midpoint of this line. The device-side connector 64 is electrically connected to a battery-side connector 66 provided at the bottom of the battery 22.

Electric power of the battery 22 is supplied to the motor 20 (electric drive source) and electrical components such as the PDU 23 via the battery-side connector 66 and the device-side connector 64. In this way, the device-side connector 64 functions as a conduction connecting member. Since the configuration of the device-side connector 64 is described in detail in WO 2019/064593 A1, detailed illustration and description thereof will be omitted.

The lower side wall 54, which is one of the side walls, is inclined so as to be substantially parallel to the axis line L of the housing portion 50. In other words, the lower side wall 54 extends upward from the first direction side toward the second direction side. Therefore, a lower end 54*bo* (the bottom wall 52 side), which is at the lowest position, is positioned on the first direction side. On the other hand, the upper end 54*up* (the opening 60 side), which is at the highest position, is positioned on the second direction side. The weight of the battery 22 is applied as a load to the lower side wall 54. In other words, the lower side wall 54 is a battery support portion that receives the weight of the battery 22. The lower end 54*bo* of the lower side wall 54 is at the same position as the bottom lower end 52*bo*.

The lower side wall 54 has a slight thickness, and its upper end is substantially horizontally cut out. The cutout serves as a guide wall 68 for temporarily placing the battery 22 thereon to change the posture thereof.

The hinge connects a front upper end 44*f* of the case body 44 configured as described above, and a front lower end 46*f* of the lid member 46. Therefore, the lid member 46 can pivot such that a rear end 46*r* rises forward and upward as described above.

The transport carriage 10 (work vehicle) according to the present embodiment is basically configured as described above, and the operation and effect thereof will be described next.

When the loaded object 30 is transported by the transport carriage 10, first, the loaded object 30 is loaded on the bucket 26. Here, the rear end 26*r* of the bucket 26 is inclined such that the rear upper end 26*ru* is oriented toward the second direction. That is, the inclination direction of the rear end 26*r* of the bucket 26 is substantially the same as the inclination direction of the battery case 42. Therefore, the capacity of the bucket 26 can be increased while avoiding a situation where the bucket 26 interferes with the battery case 42. That is, the loading amount of the transport carriage 10 increases.

On the other hand, the lower surface 42*bo* of the battery case 42 is prevented from extending in the second direction beyond a second direction side end portion (rear end) of the driving wheel 16. Therefore, it is possible to reduce the size of the transport carriage 10.

The transport carriage 10 is started in a state where the battery 22 is housed in the housing portion 50 of each of the two battery cases 42 and the housing portion 50 is closed by the lid member 46. At this time, it is needless to say that the battery-side connector 66 is electrically connected to the device-side connector 64. Accordingly, electric power from the battery 22 is supplied to the motor 20, which is an electric drive source, and various electrical components such as the PDU 23.

When the operator W moves the throttle lever 40 to a position other than the parking position after energizing the motor 20 and grips the clutch lever 38, the rotation shaft of the motor 20 and the drive shaft 24 connected to the rotation shaft via the worm gear and the spur gear are rotated. As a result, the driving wheels 16 rotate in the counterclockwise direction in FIG. 1, and the transport carriage 10 moves in the first direction (forward).

Here, in a case where the loaded object 30 is earth and sand, gravel, or the like, since these are considerably heavy objects, a large load acts on the front side (the first direction side, the driven wheels 18) of the transport carriage 10. The transport carriage 10 is small and relatively lightweight, and therefore, when the weight of the loaded object 30 is excessively large, the center of gravity is displaced to the front side (the first direction side) of the transport carriage 10. As a result, there is a concern that the posture of the transport carriage 10 may become unstable.

However, in the present embodiment, two battery cases 42 are disposed on the second direction side of the transport carriage 10, which is opposite to the first direction side, and the batteries 22 are stored in the two battery cases 42, respectively. Therefore, the weight of the battery cases 42 and the batteries 22 is applied as a load to the rear portion (the driving wheels 16) of the transport carriage 10. Accordingly, the weight of the bucket 26 on which the loaded object 30 is loaded, that is, the weight of the front portion of the transport carriage 10 and the weight of the rear portion of the transport carriage 10 where the battery cases 42 are provided are substantially balanced. Thus, the posture of the transport carriage 10 is prevented from becoming unstable when the loaded object 30 is loaded on the bucket 26. As a result, since the transport carriage 10 travels smoothly, the transportation work and the like can be smoothly performed.

Further, at the time of unloading, the bucket 26 is released from the restraint by the first lock mechanism, and the rear end 26*r* of the bucket 26 pivots about the connecting pin 28 so as to rise in the counterclockwise direction in FIG. 1. At this time, for the above-described reason, it is possible to prevent the rear portion of the transport carriage 10 from being lifted from the ground G more than necessary and to prevent the posture of the transport carriage 10 from becoming unstable due to the lifting.

In addition, each of the battery cases 42 and each of the batteries 22 are inclined with respect to the vertical direction such that the upper portion of the housing portion 50 where the opening 60 is formed extends in the second direction. In this case, the center of gravity of the battery case 42 and the center of gravity of the battery 22 can be more easily separated from the bucket 26 toward the second direction side, compared to a state where the battery case 42 is placed such that the lower surface 42*bo* thereof is horizontal (a state in which the battery case 42 is not inclined). This also contributes to balancing the weight of the front side of the transport carriage 10 (the bucket 26 on which the loaded object 30 is loaded) and the weight of the rear side of the transport carriage 10 (the battery cases 42 and the batteries 22). That is, the posture of the transport carriage 10 is further prevented from becoming unstable.

Note that the inclination direction of each of the battery cases 42 may be opposite to that in FIG. 1. That is, the axis line L of the housing portion 50 can be inclined with respect to the vertical direction such that the opening 60 is oriented upward, the upper portion in which the opening 60 is formed is extended in the first direction, and the lower portion including the lower surface 42*bo* of the battery case 42 is extended in the second direction. In this case, the battery case 42 is inclined downward from the first direction side toward the second direction side. Also in this case, the center of gravity of the battery case 42 and the center of gravity of the battery 22 can be more easily separated from the bucket 26 toward the second direction side, compared to a state where the battery case 42 is placed such that the lower surface 42*bo* thereof is horizontal (a state where the battery case 42 is not inclined).

Incidentally, it is assumed that the transport carriage 10 is used in rainy weather. Although the gap between the case body 44 and the lid member 46 is sealed by a seal member, there is a concern that rainwater or the like may enter the battery case 42 when the seal member deteriorates over time.

Here, the lower side wall 54 of the housing portion 50 is inclined so as to be oriented in the first direction from the upper end 54*up* toward the lower end 54*bo*, and the bottom wall 52 is inclined so as to be oriented in the first direction from the bottom lower end 52*bo* which is the lower end (at the lowest position) toward the bottom upper end 52*up* which is the upper end (at the highest position). Therefore, rainwater or the like is temporarily stored in the corner portion 55 formed by the lower side wall 54 and the bottom wall 52. As described above, the device-side connector 64 and the battery-side connector 66 are located on the bottom wall 52 at a position closer to the bottom upper end 52*up* than a perpendicular line that is orthogonal to a line connecting the bottom upper end 52*up* and the bottom lower end 52*bo* and that passes through a midpoint of this line. That is, both connectors 64 and 66 are close to the highest side on the bottom wall 52. Therefore, both connectors 64 and 66 are prevented from being immersed in water. The same applies to a case where dew condensation occurs in each of the battery cases 42. As described above, by inclining the housing portion 50, it is also possible to obtain an advantage that the device-side connector 64 and the battery-side connector 66 can be protected from rainwater, condensed water, or the like.

When the transport carriage 10 arrives at the place where the loaded object 30 is unloaded, the operator W may stop the transport carriage 10 by releasing the clutch lever 38. If necessary, the operator W grips the release lever 39 and releases the locking of the bucket 26 by the first lock mechanism. In this state, while gripping the grip portions 36, the operator W may pivot the transport carriage 10 such that the rear ends of the front-rear direction bars 34 rise forward. That is, the rear portion of the transport carriage 10 is lifted from the ground G. At this time, the bucket 26 pivots about the connecting pin 28. When the loaded object 30 is earth and sand or the like, this facilitates unloading of the loaded object 30 from the bucket 26.

If necessary, the battery 22 may be removed from the battery case 42 prior to this pivoting. As a result, the weight on the second direction side of the transport carriage 10 is reduced. Therefore, the operator W can easily lift the rear portion of the transport carriage 10 from the ground G, and thus can easily unload the loaded object 30 from the bucket 26.

When the transport carriage 10 is moved backward, the operator W may grip the clutch lever 38 after moving the throttle lever 40 to the backward position. In the same manner as described above, by releasing the clutch lever 38, the transport carriage 10 stops.

When the traveling of the transport carriage 10 is repeated in a manner described above, the capacity of the battery 22 decreases. In this case, the operator W replaces the battery 22.

For this purpose, the transport carriage 10 may be caused to travel to a charging station, or the battery 22 may be conveyed to the transport carriage 10.

The operator W first releases the locking (locking of the lid member 46) by the second lock mechanism and then pivots the lid member 46 to bring the battery case 42 into the open state. In accordance therewith, the opening 60 of the housing portion 50 and the upper end portion of the battery 22 are visually recognized. Next, the operator W grips a grip portion 22*h* provided at the upper end portion of the battery 22 and pulls up the battery 22 along the axis line L of the housing portion 50.

Here, a height range h of the opening 60 of the housing portion 50 from the opening lower end 60*bo* to the opening upper end 60*up* is positioned above the grip portions 36 (the front-rear direction bars 34). In this manner, the height position of the opening 60 is set such that the operator W can grip the battery 22 without largely bending down. In addition, since the housing portion 50 is inclined such that the inclination angle θ of the axis line L with respect to the vertical direction is 10° to 45°, the opening 60 substantially faces the operator W. Further, the lower side wall 54 that defines the housing portion 50 receives the weight of the battery 22. According to the features described above, the operator W can easily pull up the battery 22.

Furthermore, since the height H of the opening lower end 60*bo* of the opening 60 from the ground contact portion 12*bo* of the traveling unit 12 is low, the operator W does not need to lift up the battery 22 to a high position. Therefore, the burden on the operator W is reduced. In particular, when the height H is preferably set to be equal to or greater than 80 cm and equal to or less than 120 cm, and more preferably equal to or greater than 80 cm and equal to or less than 100 cm, the burden can be greatly reduced.

Furthermore, since the opening 60 is oriented in the second direction, the situation where the battery 22 pulled out from the housing portion 50 interferes with the bucket 26 or the like is avoided.

Next, the operator W lifts up the charged battery 22 and brings it close to the opening 60. Since the lid member 46 pivots forward and upward, the situation where the lid member 46 interferes with the battery 22 is avoided. In addition, as described above, since the operator W does not need to lift up the battery 22 to the high position, the burden on the operator W is reduced.

Figure 4:
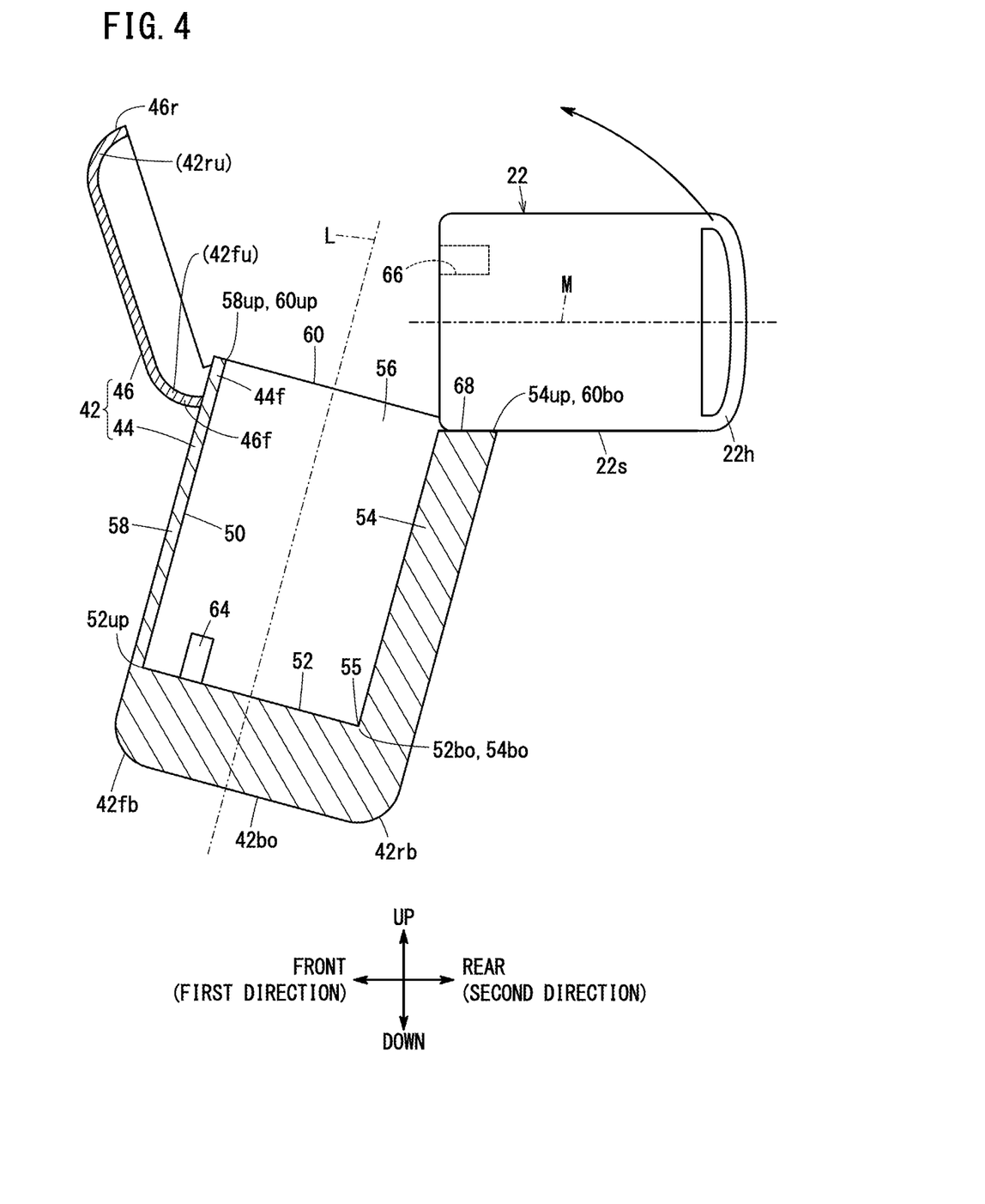
FIG. 4 is a schematic longitudinal cross-sectional view of a main portion showing a state where a detachable battery is temporarily stopped in the vicinity of an opening of the battery case.

At this point of time, there is no problem if the battery 22 is in the lying posture in which an axis line M of the battery 22 extends in the horizontal direction. Here, the guide wall 68 is provided at the opening 60 of the housing portion 50. As shown in FIG. 4, the operator W can place, on the guide wall 68, a lower end of a side surface 22*s* of the battery 22 that is in the lying posture, the side surface 22*s* facing the guide wall 68.

Figure 5:
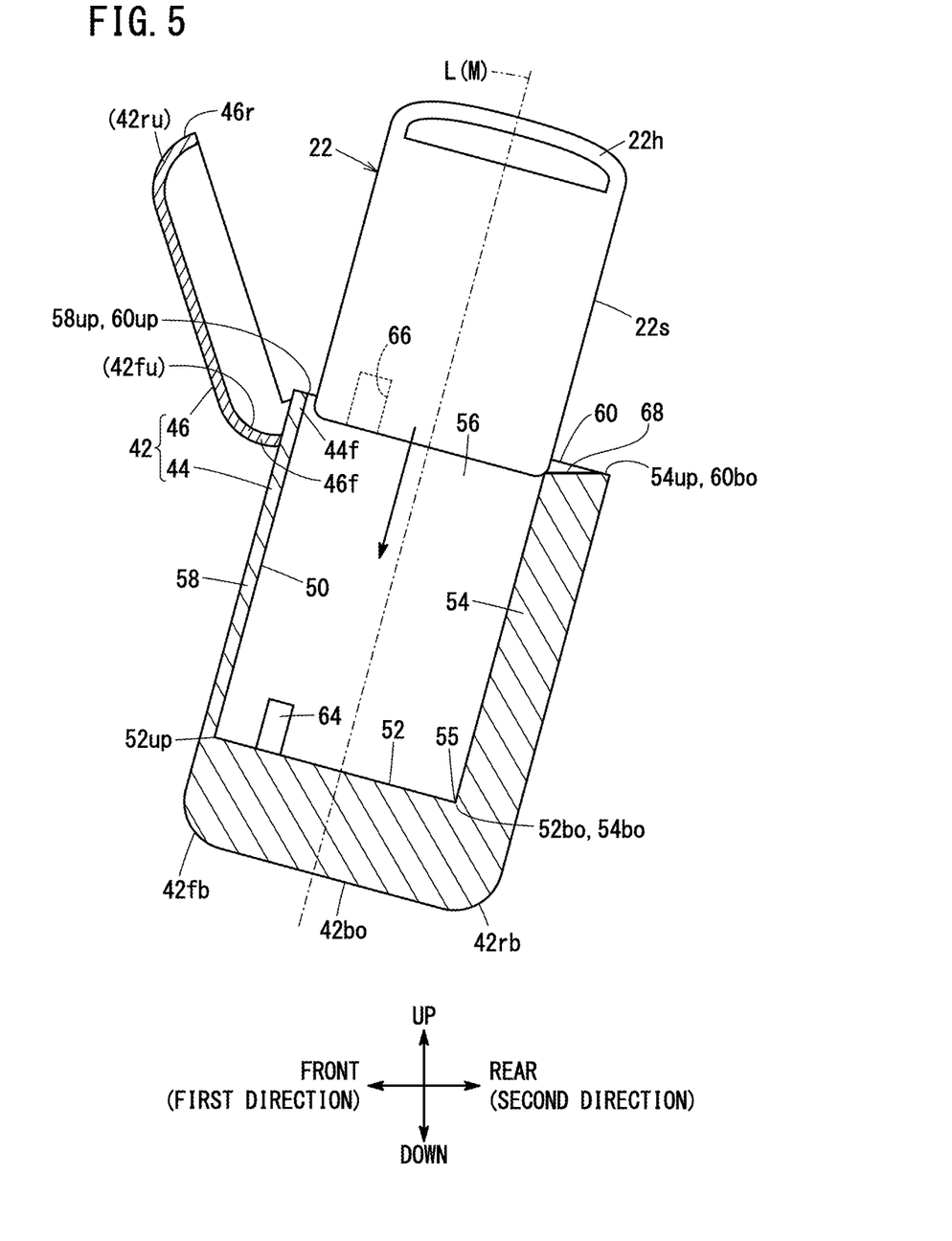
FIG. 5 is a schematic longitudinal cross-sectional view of a main portion showing a state where the posture of the detachable battery is changed from that in FIG. 4.

From this state, the operator W pivots the battery 22 about the guide wall 68 such that the battery 22 slightly stands up, and changes the posture of the battery 22 from the lying posture to the inclined posture as shown in FIG. 5. As a result, the axis line L of the housing portion 50 and the axis line M of the battery 22 become parallel to each other. That is, the axis line M of the battery 22 extends in the attachment/detachment direction.

Further, as the battery 22 becomes inclined, the bottom portion thereof slides on the guide wall 68, and the side surface 22s of the inclined battery 22 comes into contact with the lower side wall 54 of the housing portion 50. Thereafter, the battery 22 easily moves toward the bottom wall 52 by its own weight while being supported by the lower side wall 54. In this manner, by inclining the battery case 42 and the housing portion 50, the work of inserting the battery 22 into the housing portion 50 is facilitated compared to a case where the housing portion 50 extends in the vertical direction or the horizontal direction.

Here, the battery cases 42 are disposed in the space formed by the rear end 26r (the rear surface) of the bucket 26 and the sub frame 32 (between the two front-rear direction bars 34). By disposing the battery cases 42 in such a position, the work of replacing the battery 22 described above is facilitated.

Further, the situation where the battery cases 42 interfere with the bucket 26 when the bucket 26 pivots is avoided. Furthermore, compared to a case where the battery cases 42 are provided at other locations, it is possible to reduce the size of the transport carriage 10.

The present invention is not particularly limited to the above-described embodiment, and various modifications can be made without departing from the gist of the present invention.

For example, the traveling unit 12 may be a crawler. In addition, the work vehicle is not limited to the transport carriage 10, and may be a vehicle provided with a seat on which the operator W rides, for example, a dump truck and a crawler dump truck, or a handcart.

Further, the detachable battery storage unit may be constituted by a frame member.

REFERENCE SIGNS LIST

10: transport carriage
12: traveling unit
14: main frame
16: driving wheel
18: driven wheel
20: motor
22: detachable battery
23: power drive unit
26: bucket
28: connecting pin
30: loaded object
32: sub frame
34: front-rear direction bar
36: grip portion
42: battery case
43: support bar
44: case body
46: lid member
50: housing portion
52: bottom wall
54: lower side wall
56: lateral side wall
58: upper side wall
60: opening
64: device-side connector
66: battery-side connector
68: guide wall
L, M: axis line
G: ground
W: operator

The invention claimed is:

1. A work vehicle comprising:
an electric drive source driven by electric power;
a traveling unit driven by the electric drive source;
a loading unit at least a part of which is provided above a portion of the traveling unit on a side of a first direction, and on which a loaded object is loaded; and
a detachable battery storage unit at least a part of which is provided above a portion of the traveling unit on a side of a second direction that is opposite to the first direction,
wherein the detachable battery storage unit includes a housing portion that is configured to house a detachable battery configured to supply electric power to the electric drive source, and an opening that is formed in an upper portion of the housing portion, the detachable battery being inserted or removed through the opening, and
the opening is oriented upward, and an axis line of the housing portion that extends in a battery attachment/detachment direction is inclined so as to be oriented in the second direction,
the loading unit and the detachable battery storage unit are arranged alongside each other along the first direction and the second direction,
a rear end of the loading unit on a side of the second direction is formed so as to be inclined toward the second direction as the rear end goes from a lower end to an upper end,
a front end of the detachable battery storage unit on a side of the first direction is formed so as to be inclined toward the second direction as the front end goes from a lower end to an upper end,
in side view of the work vehicle, the loading unit is provided in a manner so that the upper end of the rear end of the loading unit is displaced from the lower end in the second direction, and the detachable battery storage unit is provided in a manner so that the lower end of the front end of the detachable battery storage unit is displaced from the upper end in the first direction, and
the lower end of the front end of the detachable battery storage unit is located lower than the upper end of the rear end of the loading unit and is located higher than the lower end of the rear end of the loading unit.

2. The work vehicle according to claim 1, wherein
the traveling unit includes a first wheel at the portion of the traveling unit on the side of the first direction, and a second wheel at the portion of the traveling unit on the side of the second direction, and
in side view of the work vehicle, a lower surface of the detachable battery storage unit is provided above the second wheel.

3. The work vehicle according to claim 1, wherein
the traveling unit includes a first wheel at the portion of the traveling unit on the side of the first direction, and a second wheel at the portion of the traveling unit on the side of the second direction, and
the lower end of the rear end of the loading unit is provided further on the side of the first direction than an end portion of the second wheel on the side of the first direction, and the lower end of the front end of the detachable battery storage unit is provided further on the side of the second direction than the end portion of the second wheel on the side of the first direction.

4. The work vehicle according to claim 1, further comprising an operation unit provided with a pair of grip portions gripped by an operator who operates the work vehicle, wherein
the opening is located above the operation unit.

5. The work vehicle according to claim 1, wherein
a distance from a lowest position on the traveling unit to a lowest portion of the opening at a lowest position thereof is 80 cm to 120 cm, and an inclination angle of the axis line of the housing portion with respect to a vertical direction is 10° to 45°.

6. The work vehicle according to claim 1, wherein
the detachable battery storage unit includes, in the housing portion, a battery support portion that is inclined so as to extend along the axis line of the housing portion and that is configured to support the detachable battery.

7. The work vehicle according to claim 6, wherein
the detachable battery storage unit includes, in the housing portion, a battery positioning portion that is provided so as to be orthogonal to the battery support portion and that is configured to position the detachable battery, and
a conduction connecting member that is electrically connected to the detachable battery is provided in proximity to a highest position on the battery positioning portion.

8. The work vehicle according to claim 1, wherein
the loading unit is pivotable, in a manner so that the rear end of the loading unit on the side of the second direction rises, about a pivot point on the side of the first direction of the loading unit.

9. The work vehicle according to claim 1, wherein the opening is provided in an upper portion of the detachable battery storage unit, and
the upper portion of the detachable battery storage unit includes a guide wall that is formed substantially horizontally so that the detachable battery is temporarily placed, and a posture of the detachable battery is changed.

10. The work vehicle according to claim 1, wherein the detachable battery storage unit includes a case body and a lid member that is connected to a front end of an upper portion of the case body via a hinge in a pivotable manner, and
a rear end of the upper portion of the detachable battery storage unit includes a guide wall that is formed substantially horizontally so that the detachable battery is temporarily placed and a posture of the detachable battery is changed.

* * * * *